UNITED STATES PATENT OFFICE.

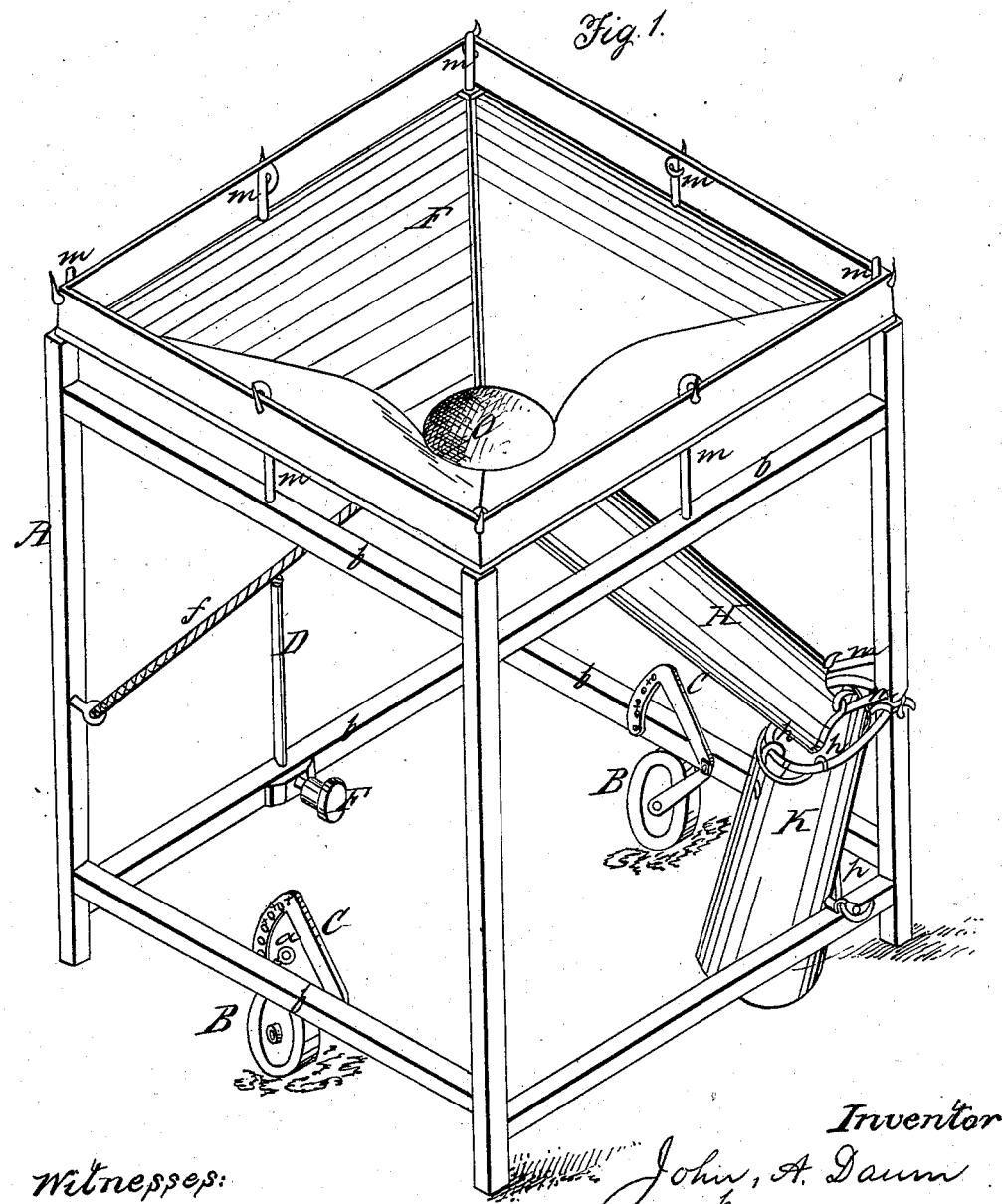

JOHN A. DAUM, OF CANTON, OHIO.

IMPROVEMENT IN FRUIT-GATHERERS.

Specification forming part of Letters Patent No. 54,696, dated May 15, 1866.

*To all whom it may concern:*

Be it known that I, JOHN A. DAUM, of Canton, county of Stark, and State of Ohio, have invented certain new and useful Improvements in Fruit-Gatherers; and I do hereby declare that the following is a full, clear, and exact description of the same, reference being had to the accompanying drawing, and to the letters of reference marked thereon.

My invention consists in an economical and simple device for the receiving of apples, peaches, cherries, and such other fruit as is generally gathered from trees.

It is an established fact that the great quantities of spoiled fruit results from bruising when gathered, which is caused by the dropping of the same upon the ground from the trees. This invention obviates the above, and is one that can be used by almost any farmer or fruit-gatherer.

In the drawing hereto attached and making a part of this specification, A represents the frame, which is made of four scantling or suitable pieces of lumber in a square form. These pieces are connected near the top and bottom by the bars $b$, as shown, and are provided with two wheels, B B. These wheels B are attached to the lower bars, $b\ b$, opposite to each other, and by means of an adjustable lever, C, to each of said wheels.

C represents the lever which attaches the wheels B B to the bars $b\ b$. This lever is made of iron or other suitable metal, being crooked in the form shown, and perforated, as seen at $x\ x\ x$, the object of which will be hereinafter set forth.

Upon the top of the frame A is the receiver E, which is a piece of muslin or other cloth extending over the entire top of said frame. The said receiver is hooked to the frame A by means of a series of metallic hooks, $m$, which point upward and form a border to the receiver.

In the center of the receiver E there is an opening, O, from which extends a muslin or cloth pipe, H. This pipe is drawn to one of the uprights of the frame A, where it is caught in two hooks, $n\ n$, in the post, and held secure and open. Directly below where the pipe H is attached there is an ordinary sack or bag, which is held upright with the mouth open by a circular wire, $g$, or other suitable device having hooks $h\ h$, which catch into the sack.

D represents an adjustable metallic bar, which is placed within one of the lower attaching-pieces, $b$, at a point about the half-way between the uprights of frame A. F is a set-screw which regulates the bar D when the frame is on the side of a hill or on uneven ground. This bar D acts as a leg or support to keep the frame in an upright position and the receiver level.

$f$ represents a cord which is attached to the pipe H at the upper part, and secured to the upright farthest from the one where the end of said pipe is attached. This cord causes the center of the receiver H to be lower at the center than at the sides, and holds the same in the required position to receive the fruit.

This fruit-gatherer is moved under the limbs of the trees and rests upon the four uprights, which act as feet. When it is necessary to move the gatherer the lever C is thrown upward, bringing with it the wheels, when a pin, $d$, is put into one of the perforations, $x$, and through the bar $b$, holding the wheel either above or on the ground.

The limbs of the tree are shaken by a pole with hook attached, and the fruit drops on the receiver E, then through the opening O and through pipe H, thence in the sack K. Thus it will be seen that the fruit is gathered into the sack without being bruised.

Having thus fully described my invention, what I claim as new, and desire to secure by Letters Patent, is—

1. The adjustable bar D, with set-screw F, secured to the frame A, when used as and for the purposes herein set forth.

2. The frame A, receiver E, pipe H, wheels B B, secured by levers C C, and bar D, arranged and used substantially as and for the purposes herein set forth.

As evidence that I claim the foregoing I have hereunto set my hand in the presence of two witnesses.

JOHN A. DAUM,

Witnesses:
 J. CREVOISIE, Jr.,
 THOS. McMILLEN.